(12) United States Patent
Hasegawa et al.

(10) Patent No.: US 6,198,787 B1
(45) Date of Patent: Mar. 6, 2001

(54) METHOD OF HANDLING A NUCLEAR REACTOR AND AN APPARATUS USED IN THE HANDLING METHOD

(75) Inventors: Hiroshi Hasegawa; Ryohei Miyahara; Kouichi Ushiroda; Masataka Aoki; Akinori Tajiri; Jun Miura, all of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/359,769

(22) Filed: Jul. 22, 1999

(30) Foreign Application Priority Data

Jul. 28, 1998 (JP) .................................................. 10-212265

(51) Int. Cl.7 ............................. G21C 19/20; G21C 19/32
(52) U.S. Cl. ............................ 376/260; 376/268; 376/272
(58) Field of Search ................................. 376/262, 263, 376/260, 272, 287

(56) References Cited

PUBLICATIONS

Japanese Patent Laid–Out Publication, No.62–185198, Pub. date—Aug. 13, 1987.*
Japanese Patent Laid–Out Publication, No.8–262190, Pub. date—Oct. 11, 1996.*

Nuclear Engineering International, pp. 273 and 249, Apr. 1974.*

* cited by examiner

Primary Examiner—Charles T. Jordan
Assistant Examiner—Kyongtaek K. Mun
(74) Attorney, Agent, or Firm—Antonelli, Terry, Stout & Kraus, LLP

(57) ABSTRACT

A method of handling an internal structure of a nuclear reactor utilizing a receptacle such as a container or a cask. A cask, for example, is lifted from outside of a nuclear reactor building through an opening which is opened at a portion of the nuclear reactor positioned just above a nuclear reactor pressure vessel. While maintaining the cask under a lifted condition, a shroud, which is an internal structure of the nuclear reactor, is transferred and inserted to the cask from the nuclear reactor vessel. Thereafter, an inlet port of the cask is closed so that the cask substantially surrounds the shroud and substantially prevents radiation from the shroud passing therethrough. The cask together with the shroud is lifted outside of the nuclear reactor building through the opening. The internal structure of the nuclear reactor can be speedily carried from the nuclear reactor building with reduced exposure of operators to radioactivity from the radioactive internal structure.

13 Claims, 14 Drawing Sheets

METHOD OF HANDLING A NUCLEAR REACTOR AND AN APPARATUS USED IN THE HANDLING METHOD

BACKGROUND OF THE INVENTION

The present invention relates to a method of handling a nuclear reactor and an apparatus used in the handling method and in particular to a handling technique of an internal structure of a nuclear reactor with which a taking-out working of the internal structure of the nuclear reactor to an outside of a nuclear reactor building or containment is provided.

In the nuclear reactor building or containment of an atomic power plant station, a nuclear reactor pressure vessel is received and in this nuclear reactor pressure vessel a shroud for surrounding a reactor core of a nuclear reactor and an upper portion lattice plate and a reactor supporting plate etc. exist as an internal structure.

In the nuclear reactor internal structure of the atomic power plant station, a damage state of the nuclear reactor internal structure is carried out to inspect and mend during every regular inspection time, however from the aspects of a conservation performance, an economic performance and a prevention preservation in a midway of durable years the nuclear reactor internal structure is exchanged over and renewed with a new nuclear reactor internal structure.

In a renewal working or processing of the nuclear reactor internal structure according to the prior art, in a nuclear reactor well pool, an upper portion lattice plate, an upper portion shroud and a reactor core supporting plate etc. are cut roughly and taken out in advance. In a nuclear reactor building using a previous-established ceiling crane, the roughly cut-down upper portion lattice plate, the roughly cut-down upper portion shroud and the roughly cut-down reactor core supporting plate etc. are temporally placed in a dry separator (herein, it is called as "DS").

Further, in DS pool, a decomposition taking-out working and a fine cutting working for the roughly cut-down upper portion lattice plate, the roughly cut-down upper portion shroud and the roughly cut-down reactor core supporting plate etc. are performed with a remote control in the water. Accordingly, the upper portion lattice plate, the upper portion shroud and the reactor core supporting plate etc. are converted to waste materials.

Accordingly, so as to isolate the nuclear reactor well pool and DS pool, a DS pool gate is newly established. Further, the fine cut waste materials (the small chips of the nuclear reactor internal structure) are received in plural receptacles such as container or casks and on occasion the fine cut waste materials are transferred and kept on the premises to a sight bunker or a solid waste material reservoir.

Accordingly, in accordance with the working for cutting roughly in the nuclear reactor well pool, the working for cutting finely in DS pool, the supplementary working for increasing the storage containers and the supplementary material amount increase, since the above stated workings extend over a long period, there is problems from the aspects of the cost and radiation exposure etc. Further, a long period for a plant stop period in a total becomes a big burden economically to an electric power company from a reduction in an operation of rate of an equipment.

On the other hand, when the nuclear reactor pressure vessel is exchanged over, as described in Japanese application patent laid-open publication No. Hei 8-285981 and Japanese application patent laid-open publication No. Hei 8-262190, a technique has known in which the nuclear reactor pressure vessel is drawn in in a transfer receptacle or container which has waited on a roof of a nuclear reactor building by a crane and the nuclear reactor pressure vessel with the transfer container is transferred to a desired point of the nuclear reactor building.

In the above stated prior art example, the nuclear reactor pressure vessel with the transfer container is moved at an upper portion to the roof by performing an uncover to the nuclear reactor pressure vessel and by lifting the nuclear reactor pressure vessel with the transfer container in the nuclear reactor building. Accordingly, an exposure reduction countermeasure against to working men in the nuclear reactor building who relates to radiation from the nuclear reactor pressure vessel is insufficient.

Taking into consideration about the exposure reduction countermeasure against to the working men in the nuclear reactor building, as disclosed in Japanese application patent laid-open publication No. Hei 9-145882, a techniques has known in which plural divided shield bodies are assembled so as to surround the nuclear reactor pressure vessel in the nuclear reactor building and the reduction of the radiation and the diffusion of the radioactivity are shielded by the shield bodies and as a result the nuclear reactor pressure vessel is taken out from the roof of the nuclear reactor building.

However, in the above stated prior art method, since the assembling working of the shield body in the nuclear reactor building equipment is accompanied with, such an assembling working requires the labor time and accordingly it takes the time for carrying out the shield bodies to an outside of the nuclear reactor building.

To avoid the labor time for requiring the assembly of the shield bodies in the nuclear reactor building, a technique described in Japanese application patent laid-open publication No. Sho 62-285100 has known. The contents described in this patent publication will be shown as follows.

Namely, a cask for storing the radioactive waste material is lifted by a crane which is provided at an outside of the nuclear reactor building and the cask is passed through a provisional opening which is provided with an opening and closing state on the roof of the nuclear reactor building and further the cask is lifted in the nuclear reactor building.

After that, the cask is separated once from the crane and the cask is placed on a floor of the nuclear reactor building and further the cask is moved in a horizontal direction at a position in which the radioactive waste material to be subjected to the carry-out exists.

Next, the radioactive waste material (in concretely, an upper portion cover of the nuclear reactor pressure vessel) is lifted in the cask using a lifting machine in the cask and after that a bottom portion of the cask is closed according to an opening and closing door.

After that, the cask is moved toward a horizontal direction at just an under portion of the provisional opening which has provided with the opening and closing state on the roof of the nuclear reactor building equipment. The cask is connected together with the crane and this cask is lifted up by the crane and further the cask is passed through the provisional opening of the cask and is carried out to the outside of the nuclear reactor building.

In the prior art technique described in Japanese application patent laid-open publication No. Sho 62-285100, it takes no labor time for requiring the assembly of the shield bodies in the nuclear reactor building, however it is effective to the reduction of radiation exposure and the diffusion of the radioactivity. However, in this prior art technique, the cask is separated once on the floor of the nuclear reactor building equipment from the crane and the cask is placed and after that the cask is moved toward the horizontal direction.

Accordingly, from the lift-in of the cask in the nuclear reactor building equipment until the lift-out of the cask, however since the working of the horizontal movement of the cask and the working of the connection and the separation of the cask and the crane are accompanied with, it takes the labor time yet.

In a case of the requirement of the above stated labor time, since the exchange-over of the internal structure is delayed, and further since also a re-operation time period of the atomic power plant station after the exchange-over of the internal structure is delayed, an operation efficiency of the atomic power station becomes worse.

Further, in a case of the decomposition of the atomic power plant station, there is a problem about a long-pending of the decomposition working.

SUMMARY OF THE INVENTION

An object of the present invention is to provide to a method of handing a nuclear reactor and an apparatus used in this handling method wherein it can be compatible with a speedy handling being accompanied with a carry-out for an internal structure of a nuclear reactor from a nuclear reactor building and a handling by reducing an exposure amount which is received by the working men from the radioactive internal structure.

For attainment the above stated object according to the present invention, it employs a method of handling an internal structure of a nuclear reactor, comprising the steps of lifting in a container in a nuclear reactor building from an outer side of the nuclear reactor building through an opening which is opened at an upper portion of the nuclear reactor building, maintaining the container under a condition in which the container is lifted at an upper portion of the internal structure of a nuclear reactor pressure vessel, storing the internal structure in the container which is maintained under the lifted condition, and lifting out the container which stores the internal structure toward an outside of the nuclear reactor building through the opening.

Further, it employs a method for exchanging over an internal structure of a nuclear reactor, comprising the steps of, taking out the internal structure through the opening which is opened at the upper portion of the nuclear reactor building in accordance with the above stated handling method of the internal structure, lifting up a new internal structure in the nuclear reactor building from the outside of the nuclear reactor building through an opening which is opened at an upper portion of the nuclear reactor building, installing the new internal structure in the nuclear reactor pressure vessel of the nuclear reactor building, and restoring the opening which is opened at the upper portion of the nuclear reactor building.

As an apparatus to realize the above stated methods, according to the present invention, it employs a handling apparatus of an internal structure of a nuclear reactor, comprising an opening opened at a portion of a nuclear reactor building which is positioned at an upper portion of a nuclear reactor well pool, a cask for storing the internal structure which has taken off from a nuclear reactor pressure vessel in the nuclear reactor building, a crane for lifting out and lifting in the cask from an outer side of the nuclear reactor building through the opening, and a hoisting device lifted up together with the cask according to the crane and for drawing in the internal structure in the cask.

BRIEF DESCRIPTION OF DRAWINGS

FIG. 6 is a view showing a hole enclosing working according to a first embodiment and FIG. 6(a) is a longitudinal cross-sectional view showing a relationship between the cask and a bottom plate of the cask and FIG. 6(b) is an upper plan view showing a relationship between a bougie car and the bottom portion of the cask;

FIG. 7(a) is a longitudinal cross-sectional view showing a relationship between the cask and a bottom plate of the cask, and FIG. 7(b) is an upper plan view showing a relationship between a bougie car and the bottom portion of the cask;

FIG. 8 is a view showing a hole enclosing working according to a third embodiment of the present invention.

FIG. 9(a) is a longitudinal cross-sectional view showing a relationship between the cask and an opening and FIG. 9(b) is A—A arrow mark direction of FIG. 9(a);

FIG. 9(a) is a longitudinal cross-sectional view showing a relationship between the cask and an opening and FIG. 10(b) is A—A arrow mark direction shown in FIG. 10(a);

DESCRIPTION OF THE INVENTION

Hereinafter, as one embodiment of a method of handling a nuclear reactor and an apparatus used in the handling method according to the present invention, an atomic power plant station having a boil water type nuclear reactor will be explained by taking as an exemplified example. However, the present invention will be applied to an atomic power plant station having another type of nuclear reactor.

Figure 1:
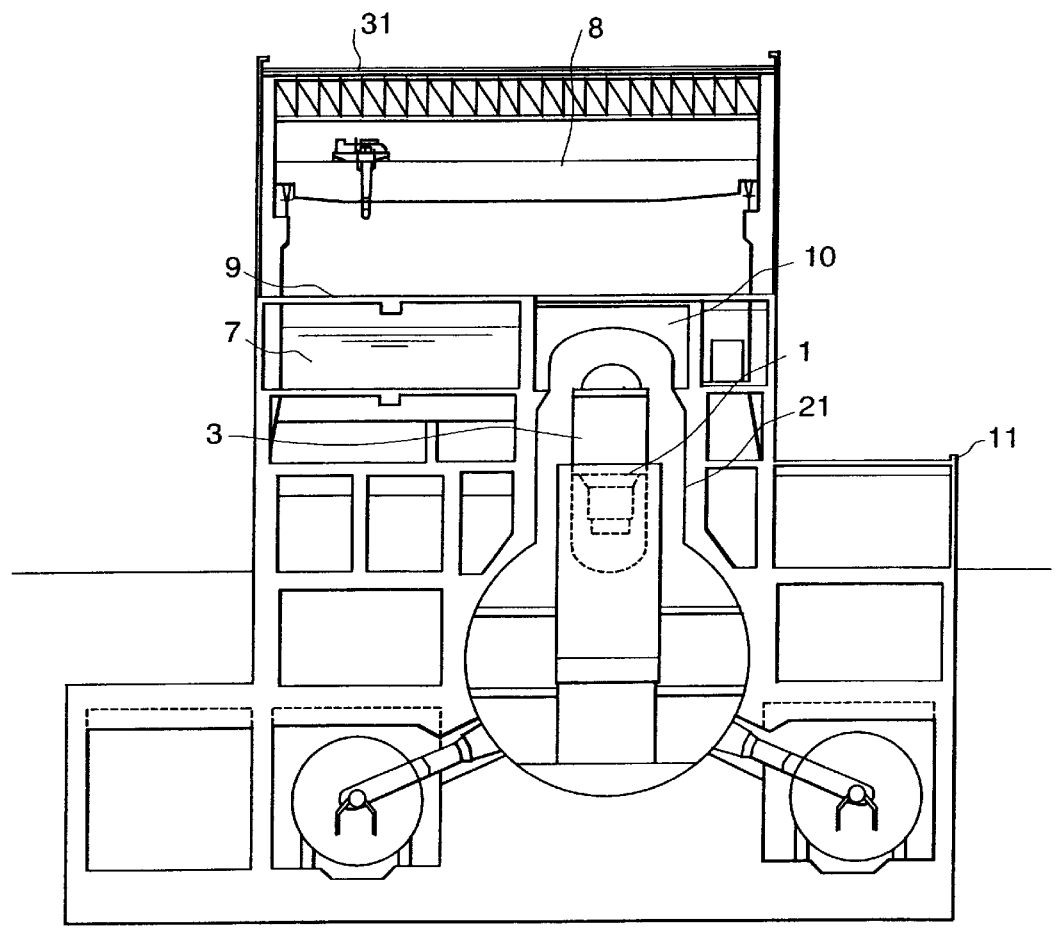
FIG. 1 is an outline longitudinal cross-sectional view of a nuclear reactor building or containment of an atomic power plant station of one embodiment according to the present invention.

In a nuclear reactor building 11 of an atomic power plant station having a boil water type nuclear reactor shown in FIG. 1, a nuclear reactor pressure vessel 3 is provided and this nuclear reactor pressure vessel 3 is stored by a nuclear reactor storing vessel 21.

Figure 2:
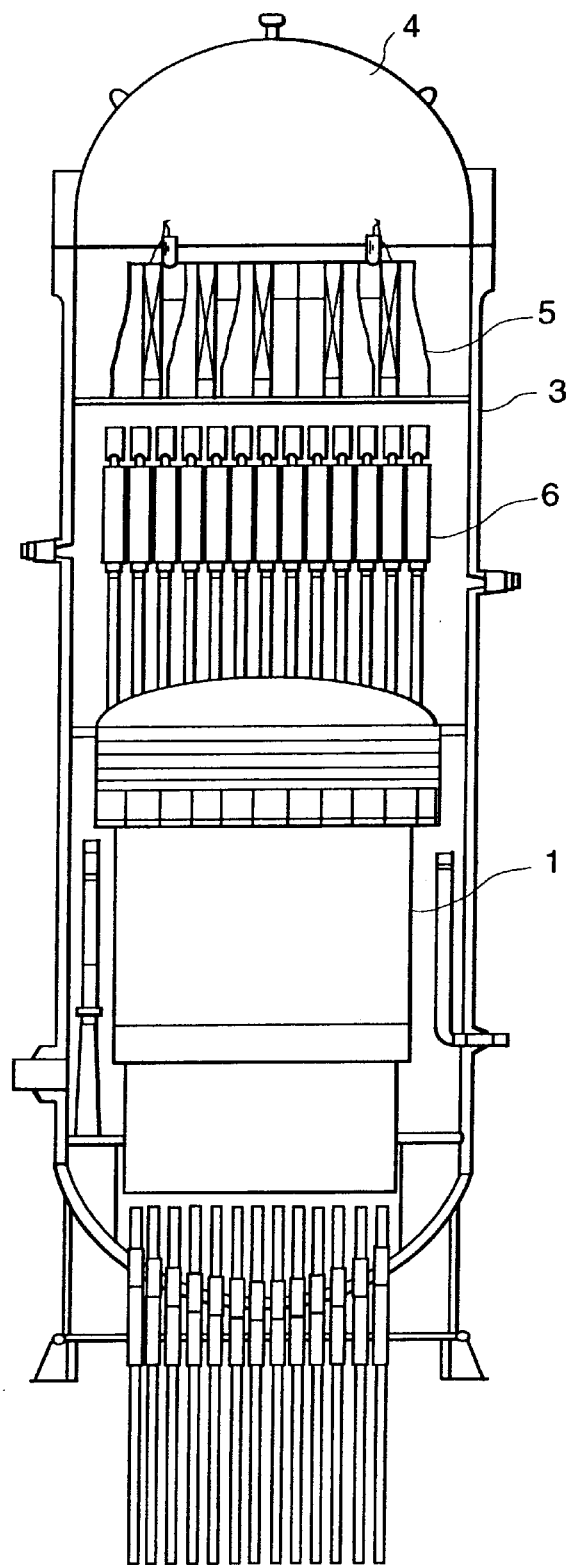
FIG. 2 is an outline longitudinal cross-sectional view of a nuclear reactor pressure vessel shown in FIG. 1.

In the nuclear reactor pressure vessel 3, as shown in FIG. 2, as an internal structure a steam dryer 5 and a vapor-liquid separator 8 and a shroud 1 etc. are provided.

In a space of an operation floor 9 of the nuclear reactor building or containment 11, an overhead crane 8 is provided, and the overhead crane 8 is used in the working of the operation floor 9.

In the operation floor 9, a dryer separator pool 7 which is abbreviated as "DS pool" and a nuclear reactor well pool 10 which communicates to an interior portion of the nuclear reactor pressure vessel 3 are provided.

Among the internal structures, since the shroud 1 is a component which surrounds a reactor core of the nuclear reactor, among the internal structures the shroud 1 most strongly recieves the radiation.

In this embodiment according to the present invention, the working for exchanging over the shroud 1 will be explained.

The nuclear reactor pressure vessel 3 in the nuclear reactor building 11 of the atomic power plant station receives the fuels of the nuclear reactor and is a vessel to which a primary cooling member comprised the liquid is inserted.

The reactor core to which the fuels of the nuclear reactor are mounted is surrounded by the shroud 1, and this shroud 1 is formed with a stainless steel cylindrical structure which isolates a flow in the cooling member which raises in the nuclear reactor and a re-circulation flow which descends a ring shape portion between an inner wall of the nuclear reactor pressure vessel 3.

In this embodiment according to the present invention, the shroud 1 which is a subject of a carry-in working and a carry-out working between the inside and the outside of the nuclear reactor building 11 is a main large weight product among the machines and the apparatuses for constituting the atomic power plant station and has 70 tons weight.

The internal structure receives the high concentration radioactive rays because the internal structure is a machinery product which is passed through a primary system coolant and this internal structure is covered by a reinforce concrete shielding wall or a steel plate concrete shielding wall.

Further, a surrounding of the internal structure is stored in a steel shape nuclear reactor storing container 21 and this internal structure works a role of the prevention of the leakage of the radiation.

These atomic power plant stations, during a periodic inspection a damage state of the internal structure of the nuclear reactor is inspected, according to the demand, the internal structure is mended, however from the aspects of the economical performance and the prevention preservation, even in a midway of the durable years, there is a case over which the internal structure is exchanged.

Figure 12:
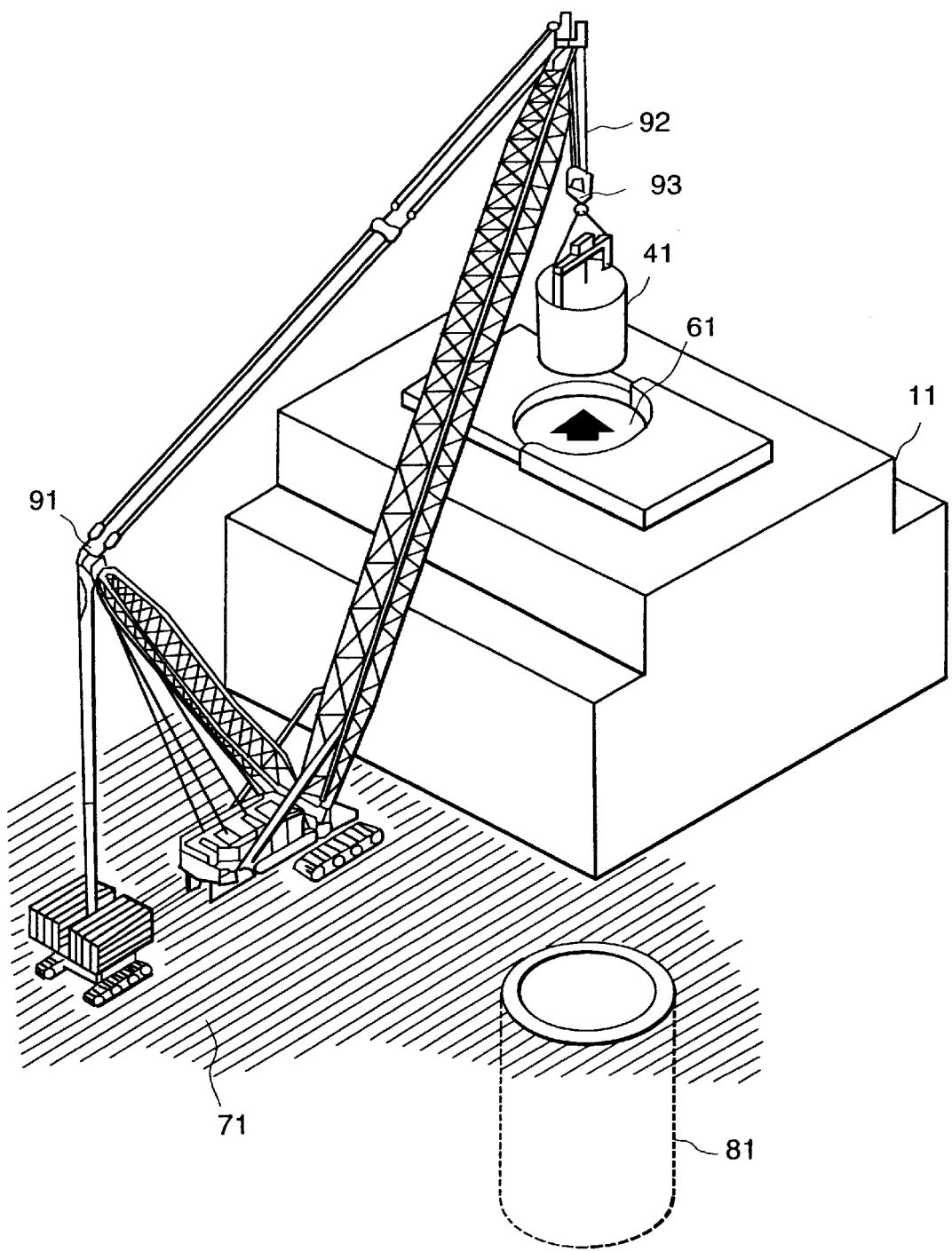
FIG. 12 is a squint view showing a positional relationship between the cask immediately after a taking-out of the nuclear reactor building and an underground reservoir.

To carry out the exchange-over for the internal structure, first of all to a sealing roof of the nuclear reactor building 11 which is positioned at a just above of the well pool 10 an opening 61 is formed as shown in FIG. 12. The opening portion 61 is closed once according to a curing sheet 63 or a rolling system shutter 62. In a case where an outside shielding wall 31 is installed at a roof portion of the nuclear reactor building 11, the carry-in and carry-out use opening 61 is provided at the outside shielding wall 31 and this opening 61 has a size in which a cask 41 is enable to pass through.

At the same time, a large scale lifting machine 91 which is a large scale crawler crane is installed at a vicinity of the nuclear reactor building 11. In a case of the installation of the large scale lifting machine 91, as shown in FIG. 12, the ground for an operation area of the large scale lifting machine 91 is strengthened as an establishment ground 71.

Further, as shown in FIG. 12, at the ground within a loading working radius range of the large scale lifting machine 91, an underground reservoir 81 is formed and an inlet port of this underground reservoir 81 is opened upwardly.

Next, the carry-out working of the shroud 1 to the nuclear reactor building is carried out and in this carry-out working the cask 41 is used.

Figure 5:
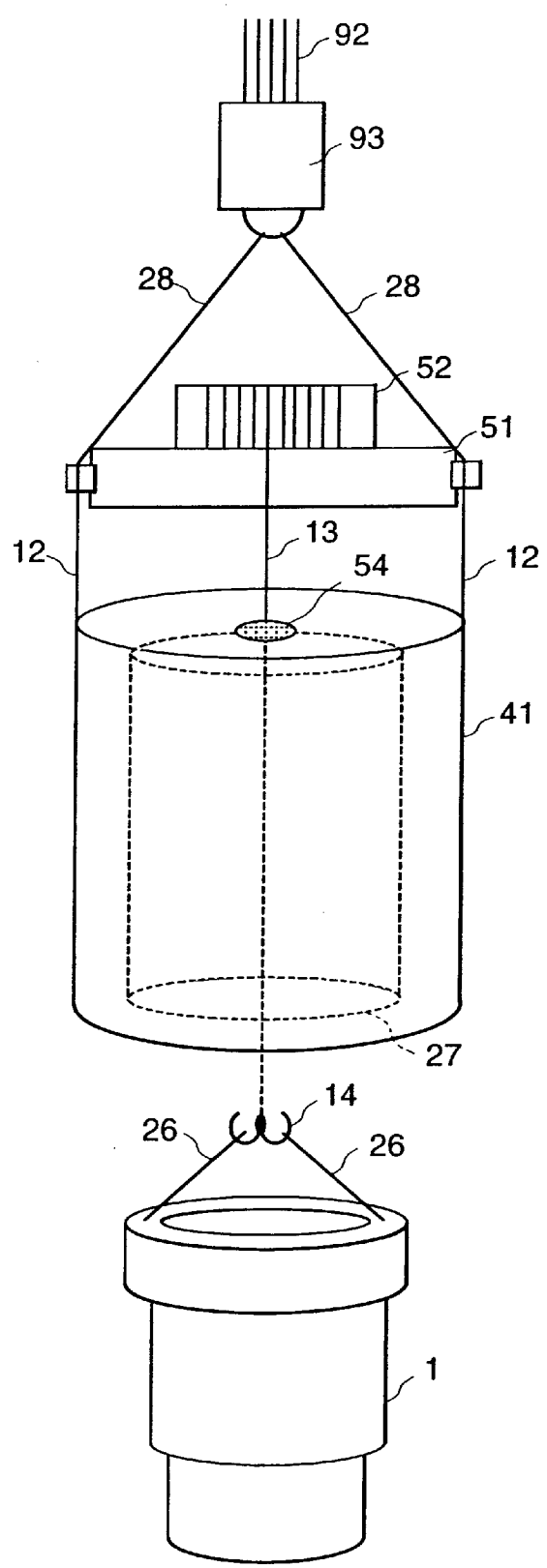
FIG. 5 is a squint view showing a relationship between a cask during the lift-up state shown in FIG. 4 and the shroud.

The cask 41 is pulled up and supported by a wire rope 12 from the lifting balance 51, as shown in FIG. 5. The cask 41 is constituted by a lower portion opened container having an inlet port at a lower portion. And at the ceiling portion of this cask 41, a penetrating hole 54 is provided and in this penetrating hole 54 a wire rope 13 of a hoisting device 52 is passed through. This hoisting device 52 is installed to the lifting balance 51 and then the wire rope 13 is wounded up or paid out according to a remote operation. A hook 14 is provided to this wire rope 13.

The lifting balance 51 and a hook block 93 of the large scale lifting machine 91 are connected by a wire rope 28 and the lifting balance 51 is pulled up and supported by the large scale lifting machine 91 to lift up and lift down freely.

The combination equipment of the above stated lifting balance 51, the hoisting device 52, and the cask 41 is prepared at the outer side of the nuclear reactor building 11.

Figure 6:
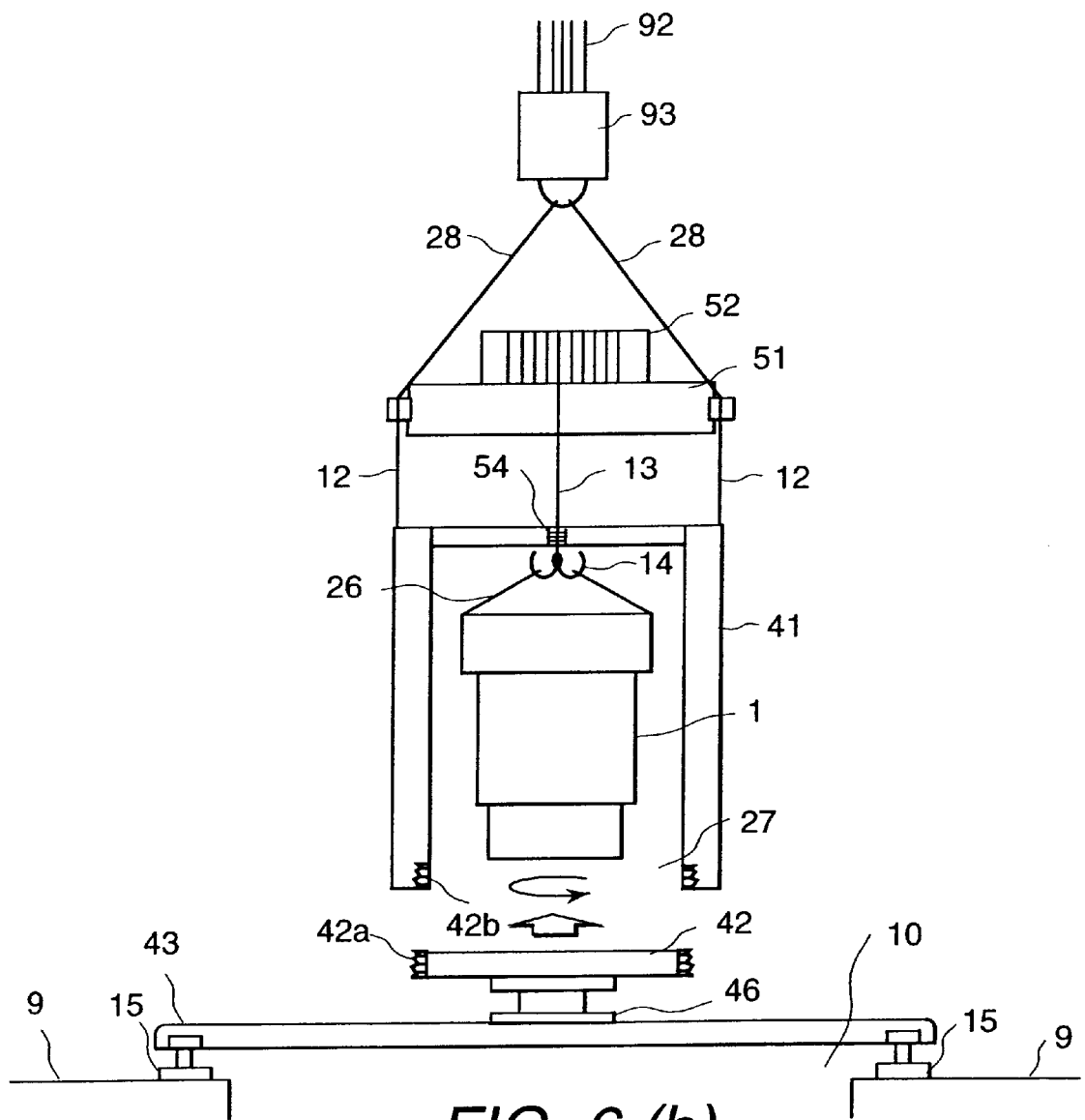
Figure 6:
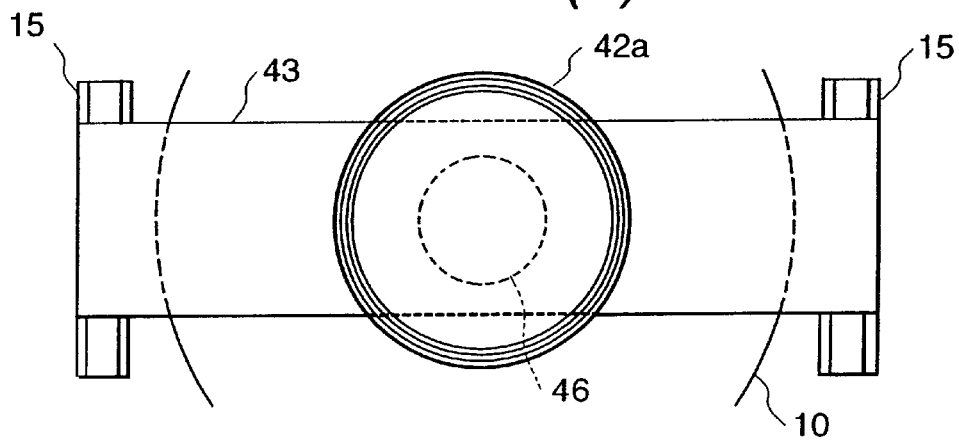

As shown in FIG. 6(a) and FIG. 6(b), to close the inlet port 27 provided at a bottom portion of the cask 41, at an outer periphery of a cask bottom plate 42, mail screws 42a of the cask bottom plate 42 is provided to engage with female screws 42b which are processed at an inner wall face of the lower portion of the cask 41. The cask bottom plate 42 is mounted to the bougie car 43 through a receiving table 46. The bougie car 43 is stridden over the well pool 10 and DS pool 7 and is installed to run freely on a rail 15 which is laid along to the well pool 10 and DS pool 7.

Figure 14:
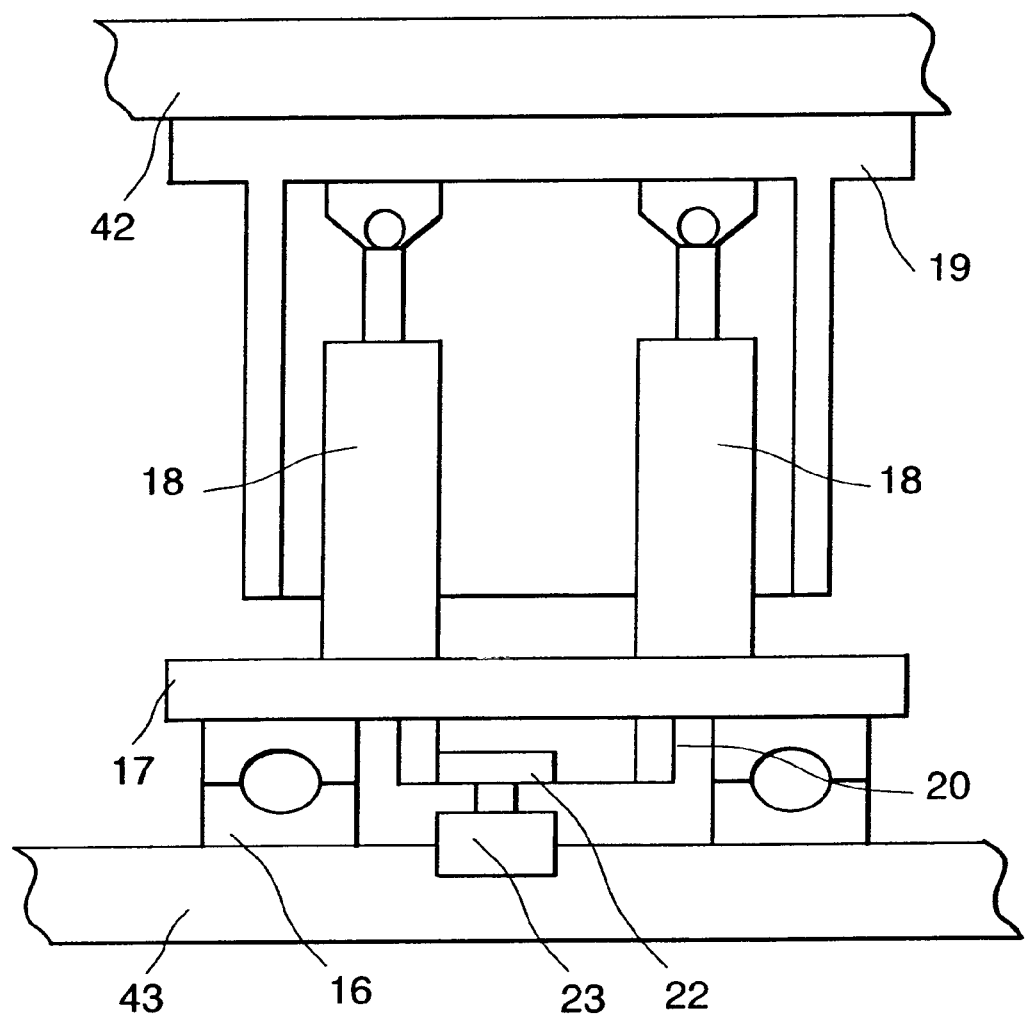
FIG. 14 is an enlargement view of a receiving table of the bougie car.

The construction of the receiving table 46 is as following. Namely, as shown in FIG. 14, the receiving table is constituted by a rotary table 17 which is mounted on the bougie car 43 to rotate freely toward a horizontal direction through a thrust bearing 16, an ascend and descend table 19 which is mounted on the rotary table 17 through an air pressure cylinder apparatus 18, an inner gear 20 which is fixed to the above stated rotary table 17, and a motor 23 for rotating and driving a pinion 22. The manner for extending and contracting a piston rod of the air pressure cylinder apparatus 18 and the drive control of the motor 23 can be carried out from a remote place.

Accordingly, when the pinion 22 is rotated and driven by the motor 23, the inner gear 20 and the rotary table 17 are rotated at the same time at a horizontal face. Further, by extending and contracting the piston rod of the air pressure cylinder apparatus 18 the ascend and descend table 19 can be moved toward the upward and downward direction, and then the ascend and descend table 19 can give the rotation operation and the ascending and descending operation to the cask bottom plate 42.

Figure 7:
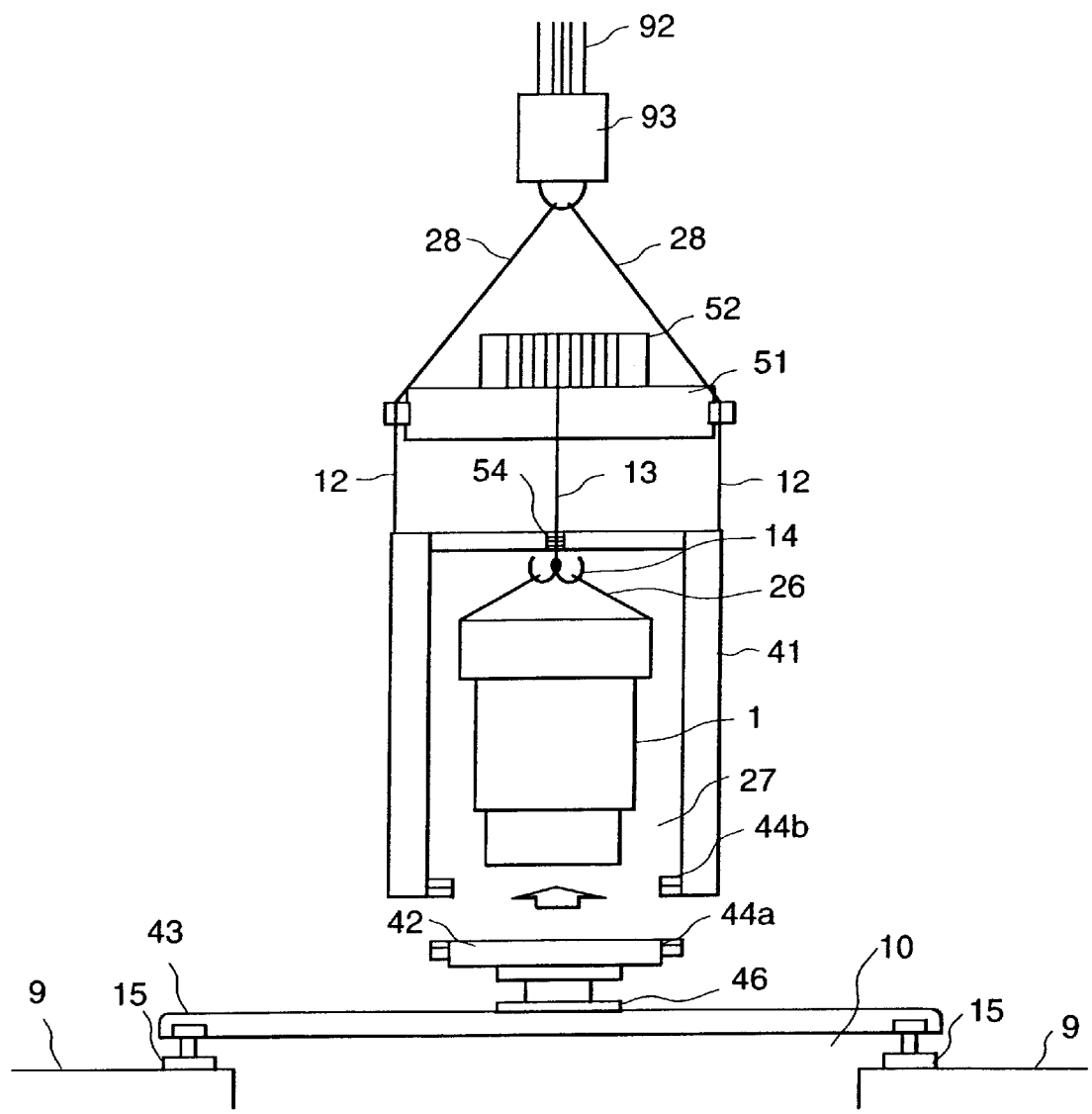
FIG. 7 is a view showing a hole enclosing working according to a second embodiment of the present invention.
Figure 7:
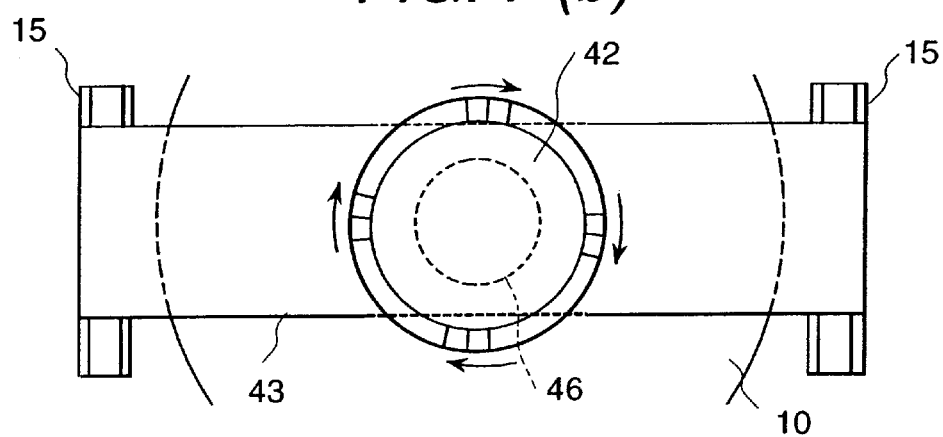
Figure 8A:
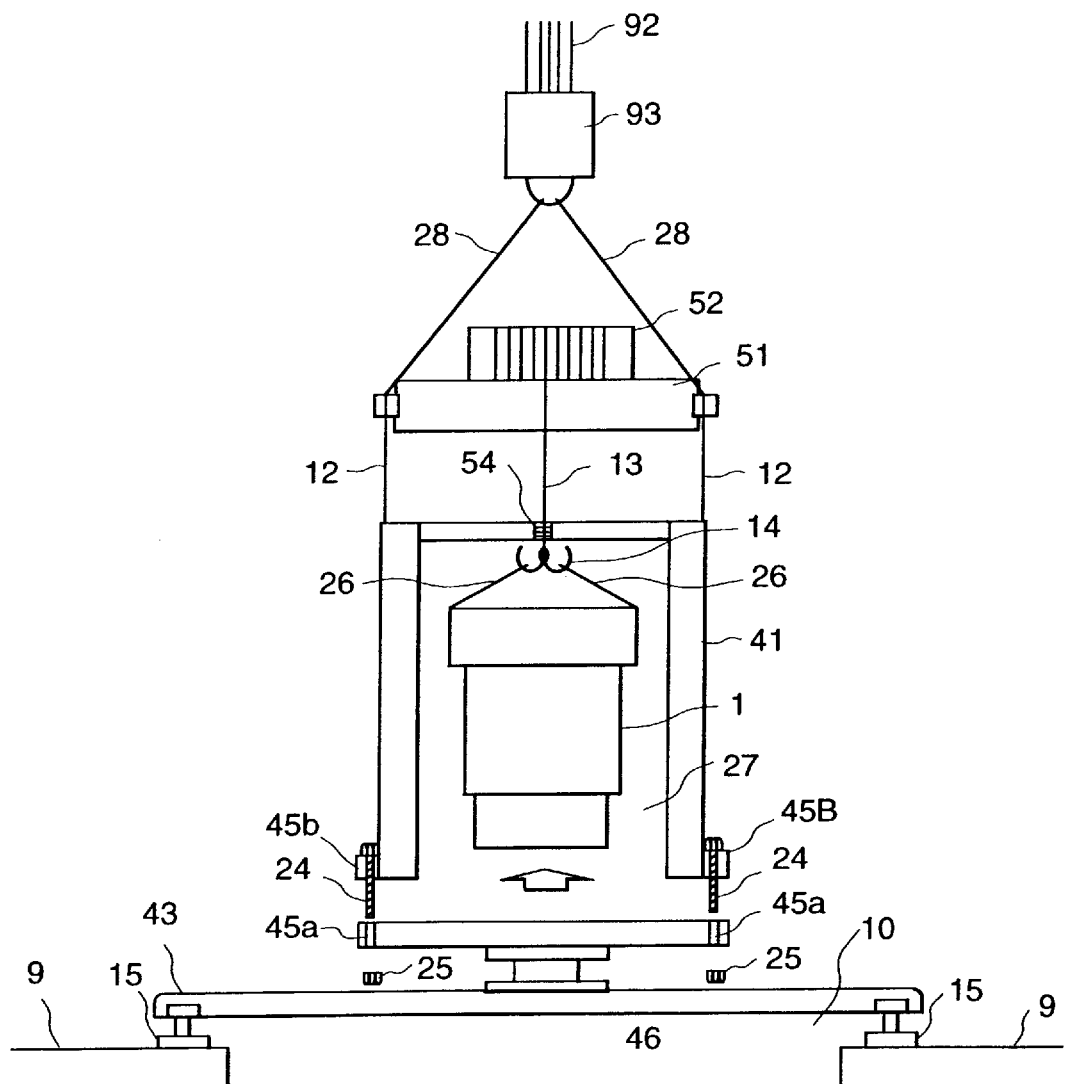
FIG. 8(a) is a longitudinal cross-sectional view showing a relationship between the cask and a bottom plate of the cask and FIG. 8(b) is an upper plan view showing a relationship between a bougie car and the bottom portion of the cask.
Figure 8B:
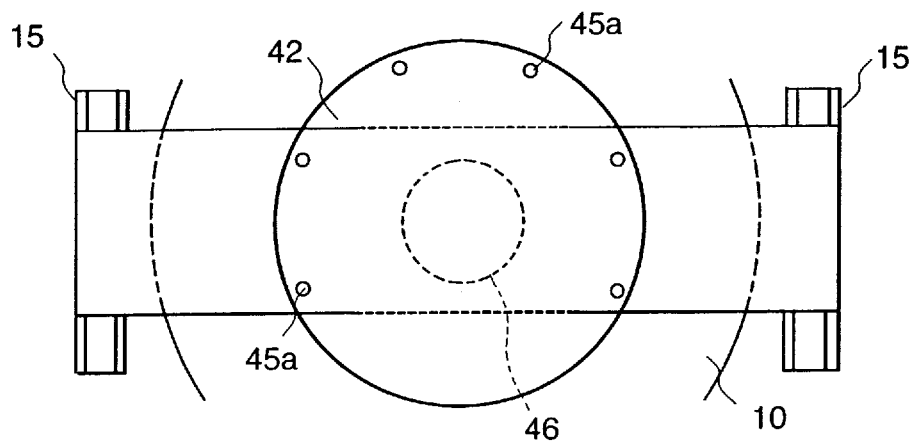

In place of the respective screws 42a and 42b of the cask 41 to the cask bottom plate 42, as shown in FIG. 7(a) and FIG. 7(b), faucet structures 44a and 44b can be employed. Further, as shown in FIG. 8(a) and FIG. 8(b), a bolt 24 is passed through a flange 45b which is fixed to the cask 41, and a structure can be employed in which the cask bottom plate 42 is fastened to the cask according to the bolt 24 which is passed through a bolt passing-through hole 45a and a nut 25.

As stated in above, the preparation of the exchangeover working is carried out, the exchange-over working is carried out as following.

Figure 3:
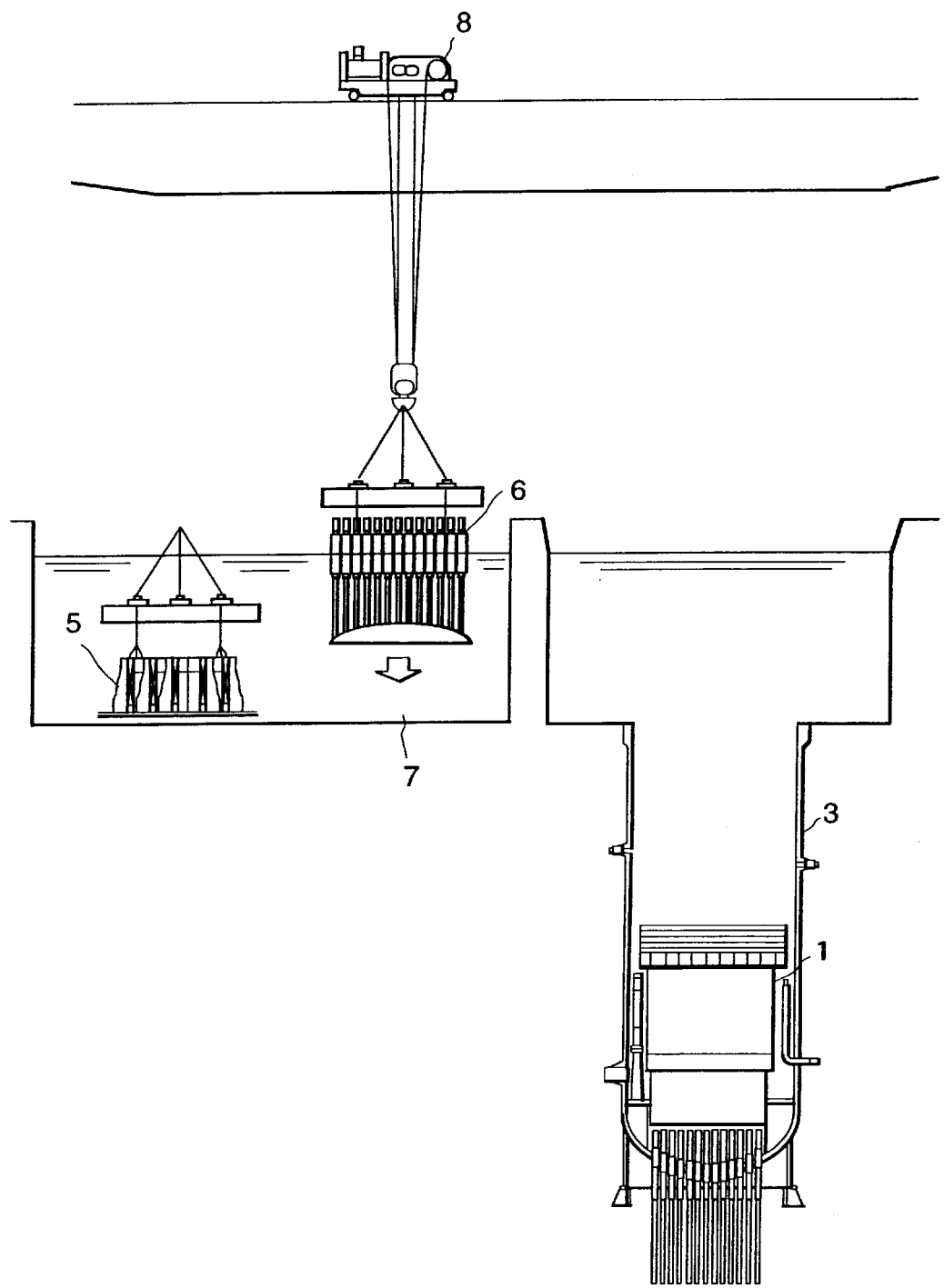
FIG. 3 is a longitudinal cross-sectional view showing a transfer and exchange working in a nuclear reactor building in a vapor-liquid separation apparatus in the nuclear reactor building shown in FIG. 1 and a vapor drying means to DS pool.
Figure 4:
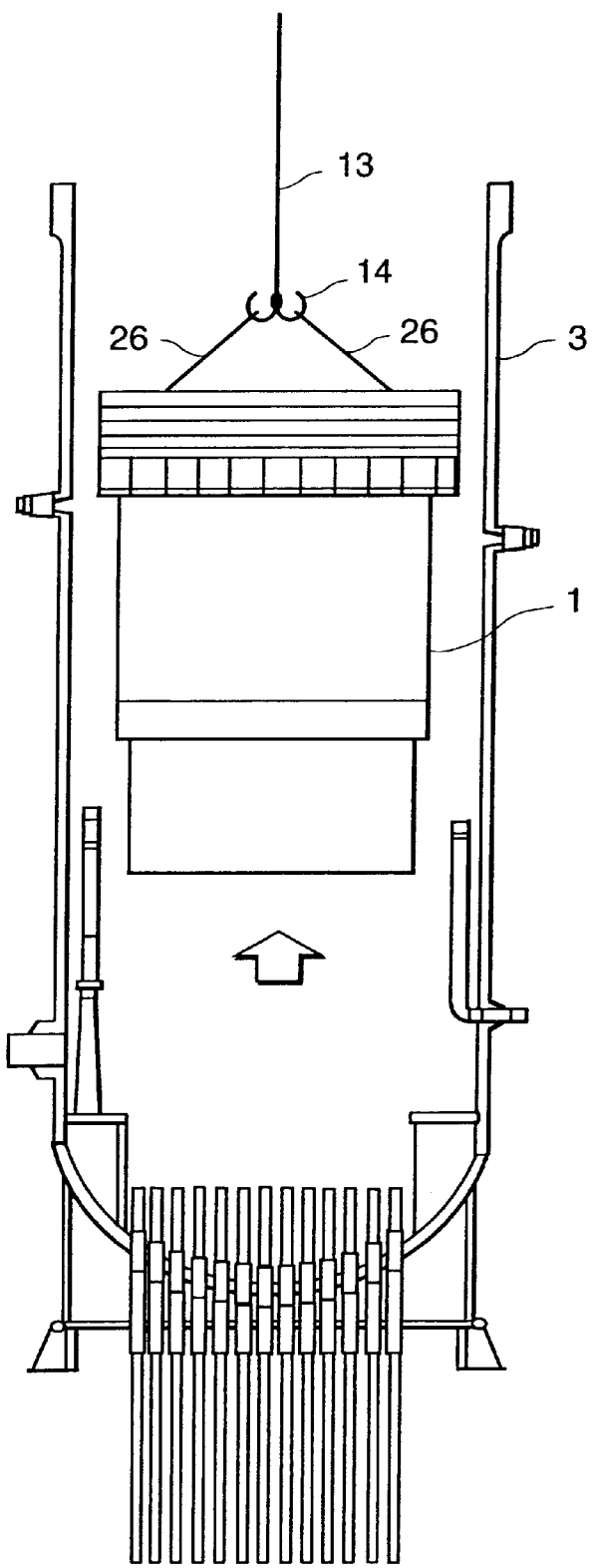
FIG. 4 is a longitudinal cross-sectional view in the nuclear reactor pressure vessel showing a state in which a shroud is lifted up from the nuclear reactor pressure vessel shown in FIG. 3.

FIG. 3 and FIG. 4 show an outline exchange-over working procedure in which the shroud 1 being the internal structure of the nuclear reactor is an object for exchanging over.

To exchange over of the shroud 1, firstly a working for taking out the already established shroud 1 in the nuclear reactor pressure vessel 3 precedes. As the taking-out procedure, a cover 4 of the nuclear reactor pressure vessel 3 is released and the water is filled in the nuclear reactor pressure vessel 3 and in the well pool 10 to shield the radioactive rays and to prevent the diffusion of the radioactivity to the operation floor 9.

After that, the steam dryer 5 and the vapor-liquid separator 6 are lifted out from the nuclear reactor pressure vessel 3 according to the overhead crane 8 and are laid in the water in DS pool 7. Further, the steam dryer 5 and the vapor-liquid separator 6 are provided temporally and are stored. In this case, the vapor-liquid separator 6 and a shroud head are formed as one body and are lifted out. Further, the vapor-liquid separator 6 and the shroud head are laid in the water in DS pool 7 and are stored.

Next, the fuels in the nuclear reactor pressure vessel 3 are taken out from the nuclear reactor pressure vessel 3 to a suitable place and are stored.

Next, the water in the well pool 10 and the nuclear reactor pressure vessel 3 is drawn out and the radioactivity cleaning working in the nuclear reactor pressure vessel 3 is carried out.

Next, the curing sheet 63 which has closed the opening 61 of the nuclear reactor building 11 and the rolling system shutter 62 are operated to close the opening 61 and the opening 61 is performed to have an opened state. After that, until the restoration of the opening 61, the pressure in the space of the nuclear reactor building 11 at least the operation floor 9 is maintained to a negative pressure condition to have a lower pressure than the pressure in the outside of the nuclear reactor building 11. The maintaining means is carried out using a ventilation apparatus which is arranged at the space of the operation floor 9.

Next, the lifting balance 51 is lifted up according to the large scale lifting machine 91 and the hoisting device 52 and the cask 41 are lifted up at the same time, and further the lifting balance 51, the large scale lifting machine 91 and the hoisting deice 52 are lifted from the opening 61 and to carry out to approach to the well pool 10.

Accordingly, the pull-up supporting condition between the lifting balance 51 according to the large scale lifting machine 91 and the large scale lifting machine 91 and the hoisting device 52 is maintained.

For this reason, the working, in which the lifting balance 51, the hoisting device 52, and the cask 41 are separated from the large scale lifting machine 91 and are reached to the operation floor 9, is not carried out.

With the above stated process, the carry-in of the empty cask 41 is performed. After the carry-in of the empty cask 41 has carried out, the opening 61 is performed to have a narrow opening in which the wire rope for lifting up the lifting balance 51 of the large scale lifting machine 91 can be passed through by closing the curing sheet 63 and the rolling system shutter 62.

By combining the procedure for maintaining at the above stated negative pressure condition, the atmosphere in the nuclear reactor building 11 is prevented to the utmost from leaking to the outside of the nuclear reactor building 11.

Next, the wire rope 13 is paid out according to the hoisting device 52 and the hook lifting down working is carried out to approach the hook 14 toward the shroud 1. Further, the nuclear reactor internal structure slinging working is carried out, in such a nuclear reactor internal structure slinging working, the wire rope 26 is paid out between a unitary structure which is constituted by the hook 14, the upper portion lattice plate and the shroud 1.

Next, the lifting-up working for lifting up the wire rope 13 according to the hoisting device 52 is carried out and then the shroud 1 is pulled up and supported as shown in FIG. 5, and the shroud 1 is stored gradually to the inner side of the cask 41 and as a result the receipt in the cask working is carried out.

Next, the bougie car 43 is run along to the rail 15 and is stopped just above the well pool 10. Then the cask bottom plate which is mounted on the bougie car 43 can be positioned just under the cask 41.

Next, the ascend and descend table 19 of the receiving table 46 is pushed up according to the air pressure cylinder apparatus 18 and the ascend and descend table 19 is rotated toward the horizontal direction, then with the female screws 42b of the cask 41 the male screws 42a of the cask bottom plate 42 is engaged, the inlet port 27 of the cask 41 is closed, accordingly the cask hole enclosing working is finished.

To more ensure the closing condition of the cask hole, a boundary portion between the cask bottom plate 42 and the cask 41 is performed to weld and to fix according to the welding manner and to carry out the seal welding. Further, the shroud 1 is lifted down on the cask bottom plate 42 according to the hoisting device 52 and the respective wire ropes 13 and 26 are given a condition where the shroud 1 is given the tension where the shroud 1 is not failed down.

The construction to which the hole closing working about the cask 41 is employed are exemplified according to the two examples shown in addition to those shown in FIG. 6(a) and FIG. 6(b), however in the constructions shown in FIG. 7(a) and FIG. 7(b), the cask bottom portion is formed with the faucet system and the closed condition is shown.

The shroud 1 is lifted up to above from the floor of the operation floor 9, and on the bougie car 43 the cask bottom portion having the faucet structure 44a through the receiving table 46 is mounted on and the shroud 1 is run and moved at just under the cask 41. The cask bottom portion 42 is raised similarly to in the above, the faucet structure 44a is inserted into the cask 41 and after that the cask bottom portion 42 is rotated toward the horizontal direction.

Then the cask bottom portion 42 is aligned to the position where the faucet structure 44b is fitted into faucet structure 44b at the cask side in the cask 41 and the receiving table 46 is retarded toward the lower portion from the cask bottom portion 42 and even those faucet structures between the cask 41 and the cask bottom plate 42 are meshed and fixed.

According to the commands, the boundary portion between the cask 21 and the cask bottom plate 42 are fixed according to the welding manner or the sealing welding manner and then the closing condition of the inlet port 27 of the cask 41 is performed more surely.

In the examples shown in FIG. 8(a) and FIG. 8(b), similarly to the examples shown in FIG. 6(a) and FIG. 6(b), the cask bottom portion 42 is positioning aligned by aligning to just under of the inlet port 27 of the cask 41. After that, at the position of the bolt 24 a bolt through-out hole 45a is rotated the cask bottom plate 42 toward the horizontal direction by the cask bottom plate 42 according to the receiving table 46 to coincide with the upward and downward directions. After that by the receiving table 46 the cask bottom plate 42 is arisen and the bolt 24 is passed through the bolt passing-through hole 45a and the screw portion of the bolt 24 which is come out toward the lower portion from the bolt passing-through hole 45a is engaged with the nut 25 and the nut 25 is tied up and then at the lower end of the cask 41 the cask 41 is adhered and accordingly the hole closing working is carried out.

In this case, according to the demands the boundary portion of the cask 41 and the cask b bottom plate 42 is fixed to and seal-welded according to the welding manner and then the sealing condition to the inlet port 27 of the cask 41 can be performed surely.

Further, when the sealing condition of the shroud 1 according to the cask 41 is performed surely to transfer, according to the hoisting device 52 the shroud 1 is received in the cask 41 and after the hole closing working of the inlet port 27 of the cask 41, the wire rope 13 of the hoisting device 52 is pulled out and the shroud 1 is set down on the cask bottom plate 42.

The the hook 14 and the wire rope 13 together is taken out from an upper portion passing-through hole 54 and then the hole closing working of the upper portion passing-through hole 54 is carried out.

The hole closing working may be the screw system in which the cover is screws to the upper portion passing through hole 54 or may be the welding system in which the cover is welded to the upper portion passing-through hole 54 or may be flange system in which using the bolt and the nut the cover is fastened to the cask 41. With the above stated structure, now the element in which the atmosphere in the cask 41 leaks to the outside of the cask 41 become nothing.

Figure 9:
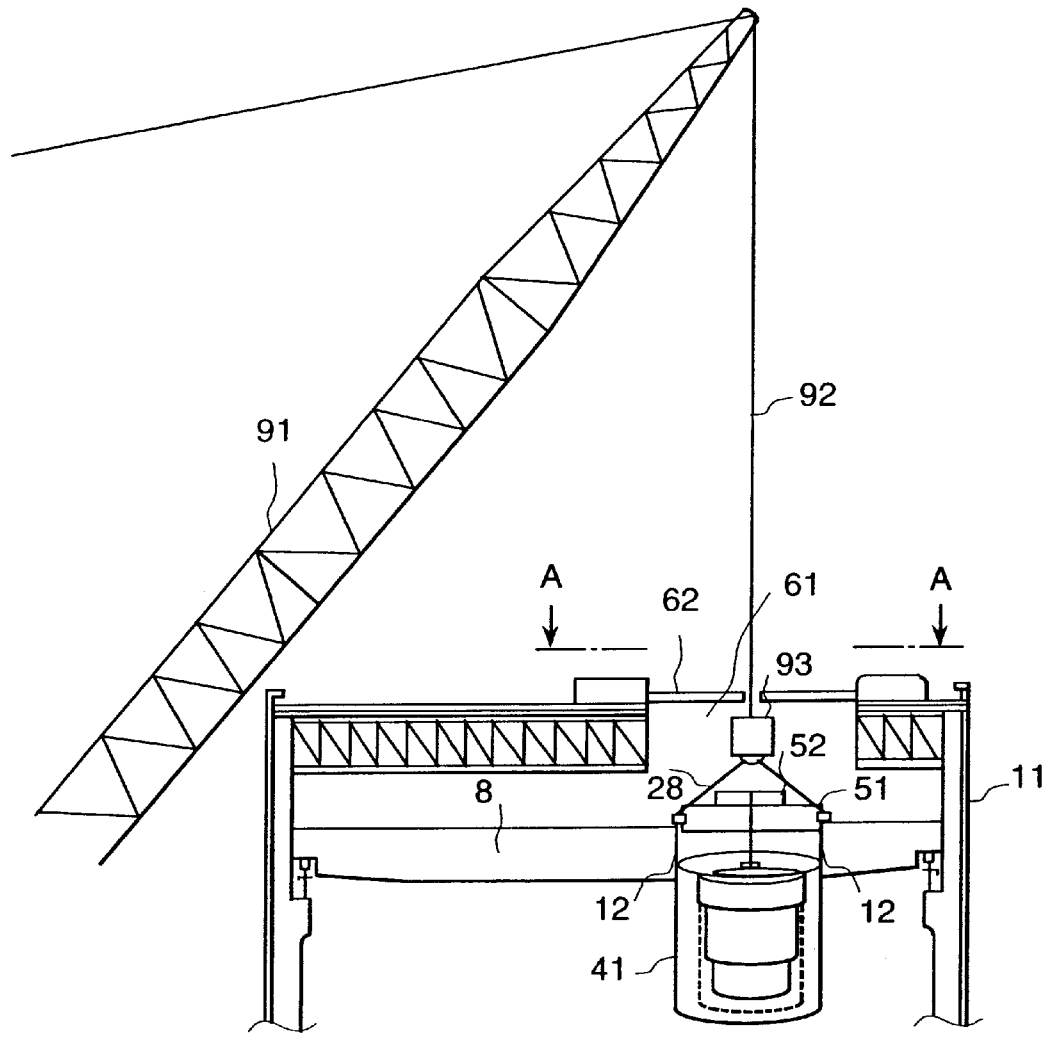
FIG. 9 is a view showing a carry-in working state of the cask according to a first embodiment of the present invention.
Figure 9:
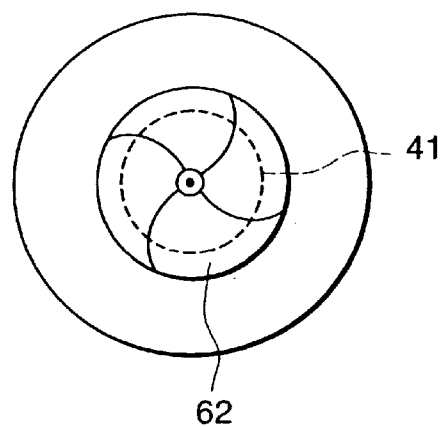

When the cask hole closing working has finished, next, as shown in FIG. 9(a) and FIG. 9(b), a lifting rope 92 is wound out from a large scale lifting machine 91 according to the large scale lifting machine 91 and a hook block 93 of the large scale lifting machine 91 which is lifted to the lifting rope 92 is lifted near to the opening 61. With this structure, further the lifting balance 51 which is lifted up from the hook block 93, the hoisting device 52 and the cask 41 are lifted near to the opening 61.

Figure 11:
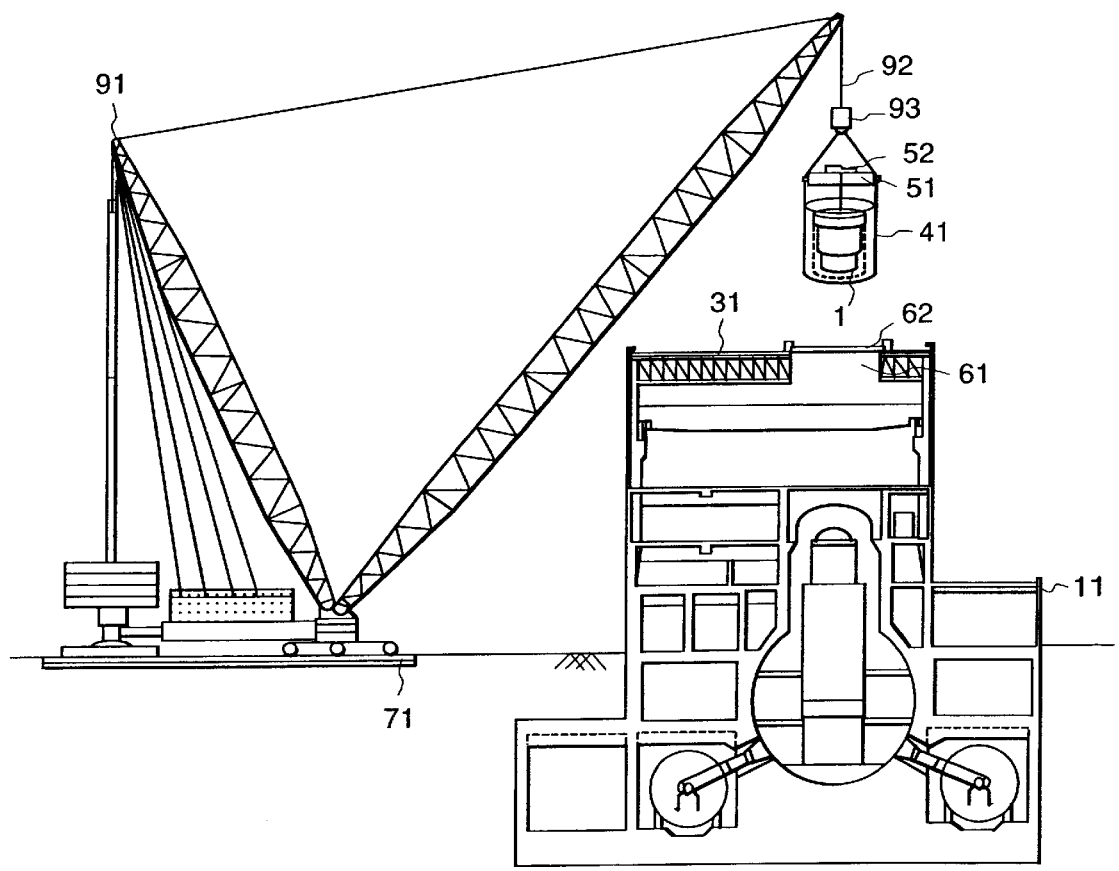
FIG. 11 shows a longitudinal cross-sectional view showing after a state of a carry-out of the cask by lifting up the cask toward an upper portion of the nuclear reactor building.

Next, it will enter the opening passing-through working, firstly the rolling system shutter 62 is opened and further the opening 61 is opened, next by the large scale lifting machine 91 the lifting rope 92 is wound up further from the large scale lifting machine 91 and to the opening 61 the lifting balance 51, the hoisting device 52 and the cask 41 are passed through. As shown in FIG. 11, the rolling system shutter 62 is closed and further then the opening 61 is closed.

After that the above stated opening passing-through working is performed, the lifting balance 51, the hoisting device 52 and the cask 41 are lifted up toward the upper portion from the nuclear reactor building 11 and then the lifting up working in which the lifting balance 51, the hoisting device 52 and the cask 41 are carried out to the upper portion of the outside of the nuclear reactor building 11 is carried out.

In the condition in which the rolling system shutter 62 is opened, from the opening 61 the atmosphere in the nuclear reactor building 11 is tried to leak toward the outside of the nuclear reactor building 11, however the pressure in the nuclear reactor building 11 is managed to a lower negative pressure condition than the pressure in the outside of the nuclear reactor building 11.

Accordingly, the leakage of the atmosphere in the nuclear reactor building 11 is checked and the restraint of the radioactivity diffusion toward the outside of the atmosphere in the nuclear reactor building 11 can be strengthened.

This rolling system shutter 62 is formed by making the large scale of a construction of a diaphragm mechanism of a camera and the opening 61 can be opened according a move of four diaphragm blades toward a radial direction.

Figure 10:
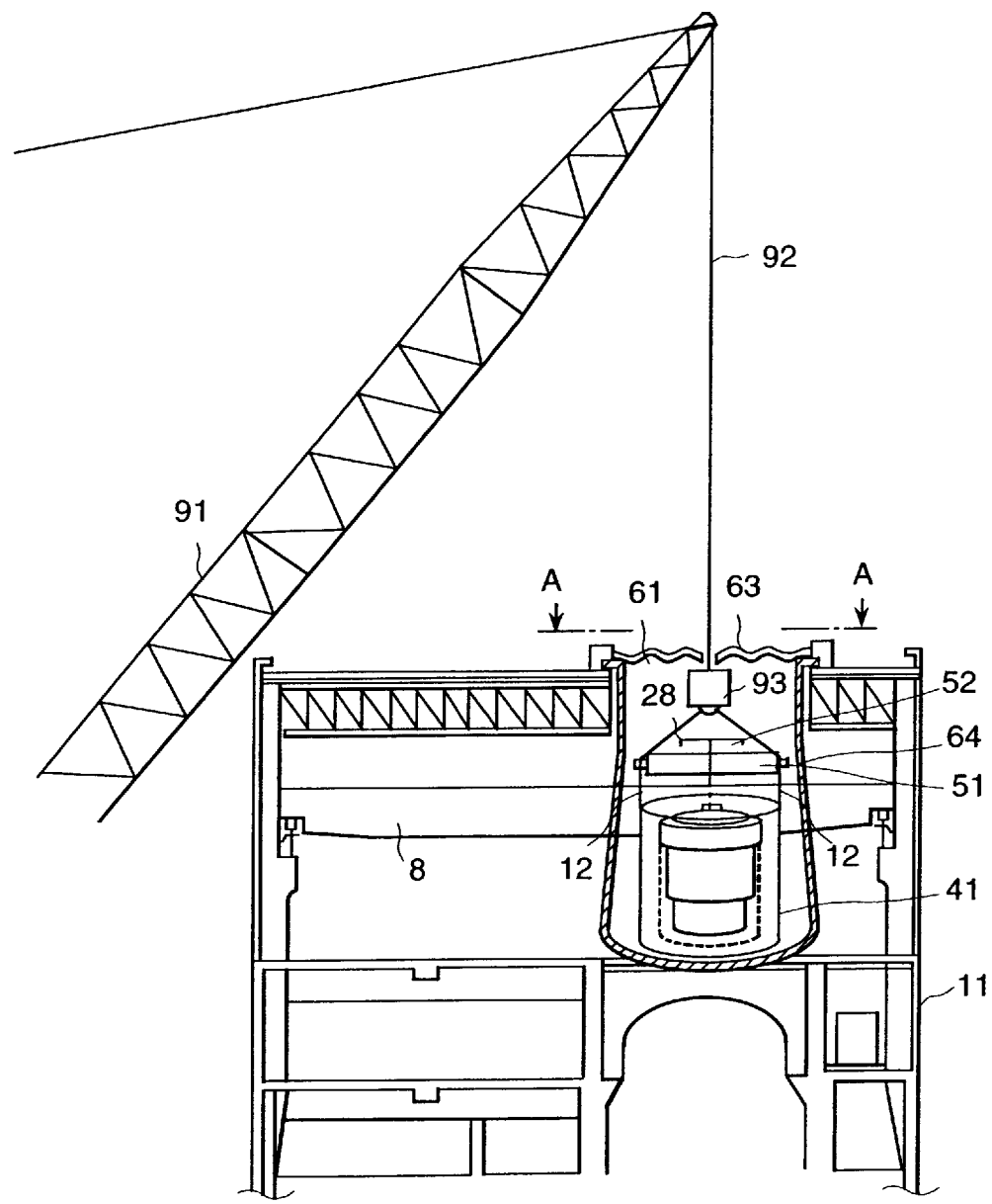
FIG. 10 is a view showing a carry-in working state of the cask of a second embodiment according to the present invention.
Figure 10:
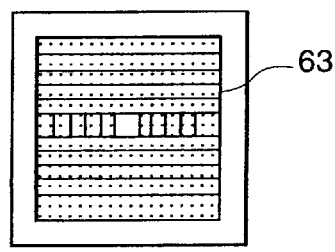

In place of the rolling system shutter 62, as shown in FIG. 10(a) and FIG. 10(b), the shape of the opening 61 can be formed with a quadrangle shape and from four sides of the quadrangle shape directing toward a center of the opening 61, four curing sheets 63 are spread by proceeding to the horizontal direction and the opening 61 is closed, in reversely by folding the four curing sheets 63 the opening is opened, according a construction for opening and closing the opening 61 can be employed.

Another means for preventing the leakage of the atmosphere to the minimum through the opening 61 from in the nuclear reactor building equipment 11, there is a method for enclosing the cask 41, as shown in FIG. 10(a) and FIG. 10(b).

Namely, in the above stated another method, firstly the cask 41 is lifted by approaching the cask 41 to the opening 61 through the large scale lifting machine 91 and holding under this condition the lifting balance 51, the hoisting machine 52 and the cask 41 are enclosed by a sheet which is installed sealable to four sides of the opening 41 and between a space of the cask 41 from the sheet 64 and a space of the operation floor at an outside the communication of the atmosphere can be prevented.

After that, the curing sheet 63 is folded at a side of the four sides of the opening 41 and the opening 61 is opened and after the lifting balance 51, the hoisting machine 52 and the cask 41 are lifted at a height of the cask 41 as shown in FIG. 11, and then the shroud 1 is stored from the nuclear reactor building 11 and are carried out the outside.

Even when the opening 61 is opened, since there is a possibility in which only the atmosphere at the space of the cask 41 side from the sheet is leaked at the maximum, a safety can be attained, and further in a case of the open of the opening 61, even the rush-in matters from the outside of the nuclear reactor building 11 and the atmosphere are entered into the space of the operation floor 9, the rush-in matters and the atmosphere are enclosed by the sheet 64, accordingly the diffusion of the atmosphere in the space of the operation floor 9 can be prevented.

Next, after the lifting of the cask 41 which has stored the shroud 1 is carried out toward the upper portion of the nuclear reactor building 11, by swirling the boom of the large scale lifting machine the cask 41 is positioned at the just upper portion of an underground reservoir 81, accordingly the swirl working is carried out.

Next, the cask 41 is fixed in the underground reservoir 81 and then the storage storing and fixing working is carried out.

Next, the wire rope 12 is taken off from the cask 41 and the cask 41 is taken off from the lifting balance. Further, the wire rope 13 is cut off, for example, and the connection between the hoisting machine 52 and the shroud 1 is released, the slinging-out working is carried out, and next the inlet port of the underground reservoir 81 is covered and closed, then the carry-out working is finished.

In a case of the decomposition of the atomic power plant station, in place of the above stated carry-out working a newly shroud is carried in the nuclear reactor pressure vessel 3 and then in this case the installation working is not accompanied with.

However, in a case of the replace working of the shroud 1, after the finish of the carry-out working, the carry-in working of a newly shroud in the nuclear reactor building equipment 11 is accompanied with.

Figure 13:
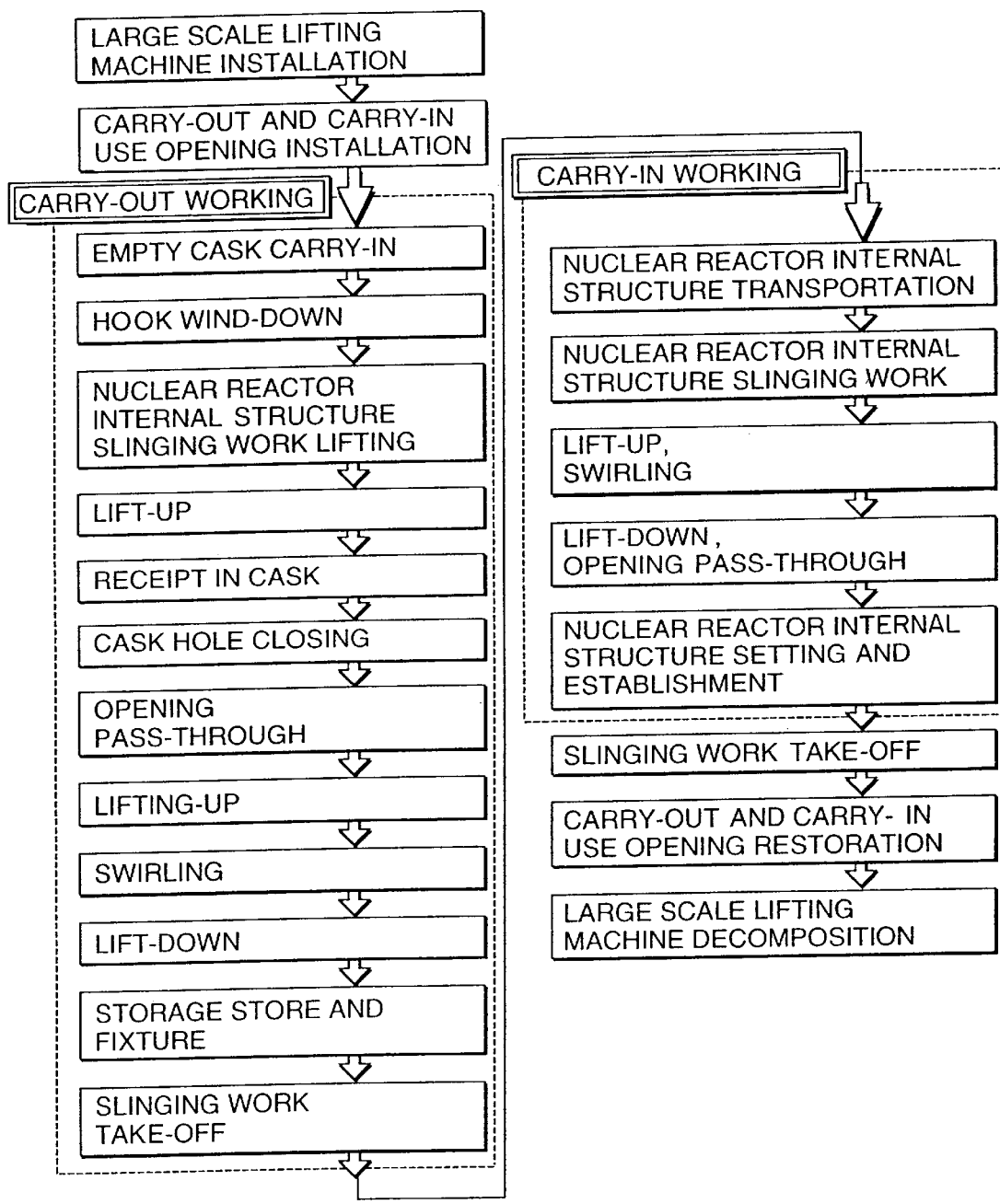
FIG. 13 is view showing a sequence of carry-out and carry-in of the nuclear reactor internal structure.

The above stated carry-in working is carried out in accordance with the working process which is indicated as the carry-in working at a right side of FIG. 13. Namely, first of all, the new shroud is transported at the goods receipt position where the new shroud can be lifted by a trailer etc., accordingly the nuclear reactor internal structure transportation working is carried out.

Next, between a hook block 93 of the large scale lifting machine 91 and the new shroud, the nuclear reactor internal structure slinging working for laying the wire rope is carried out.

Next, the new shroud is lifted up at the goods receipt position according to the large scale lifting machine 91 and by swirling the boom of the large scale lifting machine 91 toward the horizontal direction the new shroud is positioned just above of the opening 61, according the lifting-up and swirling working is carried out.

Next, the opening 61 is opened by operating the rolling system shutter 62 or the curing sheet 63 and the new shroud is lowered according to the large scale lifting machine 91 and the opening 61 is passed through and entered into the nuclear reactor building 11.

Next, the opening 61 is closed, except for a clearance in which the lifting rope 92 can be passed through, according to the rolling system shutter 62 and the curing sheet 63, accordingly the lowering and opening passing-through working is carried out.

In this above stated case, since the pressure in the nuclear reactor building 11 is managed to have the lower negative pressure management condition than the pressure in the outside of the nuclear reactor building 11, the leakage of the atmosphere in the nuclear reactor building equipment 11 can be checked and the radioactivity diffusion toward the outside of the atmosphere in the nuclear reactor building 11 can be prevented.

Next, the new shroud is lifted down further and entered into the nuclear reactor pressure vessel 3 and this new shroud is set at the position where the previous established shroud 1 has existed, accordingly the nuclear reactor internal structure installation and setting working is carried out.

Next, the wire rope which is laid out between the new shroud and the hook block 93 is taken out from the new shroud, accordingly the slinging-out working is carried out.

After that, the above stated hook block 93 is lifted out at the outside of the nuclear reactor building 11 and then the carry-in working is finished.

After that, the opening is restored to the original state, accordingly the carry-in and carry-out use opening restoration working is carried out. Next, the large scale lifting machine 91 is decomposed and withdrawn.

According to the invention, since the container which is lifted in the nuclear reactor building is positioned above the internal structure of the nuclear reactor pressure vessel under a lifted condition and the internal structure is inserted in the container under the lifted condition, and since in the nuclear reactor building, there are unnecessary to carry out an assembly of the container a lowering of the container to a floor in the nuclear reactor building, a horizontal move on the floor, a connection and a release to a lifting means of the container after the lowering, and a connection working during the lowering and further it can transfer to the lifting out working, leaving the container with the lifted condition the internal structure can be stored in the container and the internal structure can be carried out speedy at the outside of the nuclear reactor building, and further the container can be shield the diffusions of the radioactive rays and the radioactivity from the internal structure, as a result the effects of the diffusion of the radioactivity in the nuclear reactor building and the restraint of the radiation exposure can be attained.

According to the invention, as the container the cask is used.

According to the invention, by accompanying the cask with the hoisting device the cask and the hoisting device are lifted in the nuclear reactor building, after the lifting-in according to the hoisting device which is arranged at the outer side of the cask the internal structure can be lifted up from the nuclear reactor pressure vessel and the internal structure can be stored in the cask and the internal structure can be carried out more speedy at the outside of the nuclear reactor building and the radioactive rays in the cask from the internal structure can be shielded according to the cask, as a result the effects can be obtained such effects are that the hoisting device which is arranged at the outer side of the cask does not strongly recieve radiation and it may be dispensed with to make little a part which becomes to a radioactive waste material.

According to the invention, since the cask bottom portion member is carried in to the lower portion of the inlet port of the cask according to the bougie car and the inlet port of the cask is closed by the cask bottom portion member and the move of the cask bottom portion member is carried out according to the bougie car and further the cask is lifted up always and the space for enable to carry in the cask bottom portion to the lower portion of the inlet port of the cask is obtained easily, as a result the closure working can be carried out speedy, and also the inlet port of the cask can be closed at the height near to the operation floor, the effects in which the diffusion of the radioactivity into the nuclear reactor building and the restraint of radiation exposure can be attained more effectively.

According to the invention, using the same crane since the lifting-out of the cask from the nuclear reactor building to the lifting-in to the reservoir can be carried out consistently, the carry-in working of the internal structure to the reservoir can be speedy by lessening the intermittent working.

According to the invention, by limiting to the passing-through of the cask to the opening, the opening is opened widely according to the opening and closing apparatus and the leakage of the atmosphere in the nuclear reactor building to the outside of the nuclear reactor building which occurs by the open of the opening can be restrained and further the inside of the nuclear reactor building is formed to the negative pressure in comparison with the outside of the nuclear reactor building and the occurrence of the flow of the atmosphere from the opening to the outside of the nuclear reactor building can be deprived of and then the leakage of the atmosphere in the nuclear reactor building to the outside of the nuclear reactor building can be restrained from an aspect of the pressure, and further employing a complex means of the opening and closing apparatus and the pressure adjustment the leakage of the atmosphere in the nuclear reactor building to the outside of the nuclear reactor building can be deprived of, and as a result an effect in which the discharge of the radioactivity to the outside portion can be avoided at the utmost.

According to the invention, in a case where the cask is lifted out to the outside of the nuclear reactor building through the opening, since the leakage of the atmosphere in the nuclear reactor building from the opening is shielded according to a sheet for enclosing the cask and since the leakage of the atmosphere in the nuclear reactor building from the opening is prevented, as a result an effect in which the discharge of the radioactivity to the outside portion can be avoided at the utmost.

According to the invention, an effect in which the shroud as the internal structure is handled collectively and effectively by not subdividing the shroud can be obtained.

According to the invention, since the internal structure in the nuclear reactor can be exchanged speedy and as a result an effect in which the time of the re-operation of the nuclear reactor using the renewed internal structure of the nuclear reactor can be hastened.

According to the invention, in addition to the effect of the invention defined in claim 9, the shroud as the internal structure is carried out collectively from the nuclear reactor building by not subdividing the shroud and as a result an effect in which the shroud is exchanged speedy can be obtained.

According to the invention, the cask which is lifted by the crane from the outside of the nuclear reactor building equipment is lifted together with the hoisting device in the nuclear reactor building from the opening of the nuclear reactor building, and the cask which is lifted in the nuclear reactor building and the hoisting device are held by chinning the crane and the hoisting device which is lifted up according to the crane lifts the internal structure and then the internal structure carried out the double chinning state, and the internal structure is lifted up further according to the hoisting device and drawn in the cask, after the internal structure is drawn in and stored, under the stored condition of the internal structure the internal structure and the cask are passed through together with the opening of the nuclear reactor building according to the crane and is lifted up, then the operation for carrying out the nuclear reactor building to the outside can be obtained.

According to this operation, since the internal structure is stored in the cask and is treated, the scattering of the radioactive and the radioactivity material from the internal structure can be restrained according to the cask and under the chinning condition of the hoisting device and the cask according to the crane the storing working of the internal structure in the cask can be carried out, and as a result an effect in which the internal structure can be treated speedy without the accompanying of the attachment and detachment working of the cask to the crane in the nuclear reactor building can be attained. According to the invention, since the inlet port of the lower end of the cask is closed according to the cask bottom plate, the radiation ray exposure of the operators and the diffusion of the radioactive material from the internal structure can be restrained.

According to the invention, since the working for closing the inlet port of the cask is carried out speedy using the boggier car, an effect for providing the handling apparatus of the internal structure of the nuclear reactor in which the more speedy carry-out of the internal structure of the nuclear reactor can be provided.

According to the invention, an effect in which the shroud as the internal structure can be handled speedy by not subdividing the shroud can be obtained.

What is claimed is:

1. A method of handling an internal structure of a nuclear reactor, comprising the steps of:

lifting and inserting a receptacle into a nuclear reactor building containing the nuclear reactor from outside of said nuclear reactor building through an opening which is opened at an upper portion of said nuclear reactor building;

maintaining said receptacle under a lifted condition in which said receptacle is positioned above an upper portion of said internal structure of a nuclear reactor pressure vessel of the nuclear reactor;

inserting and storing said internal structure in said receptacle which is maintained under said lifted condition so that said receptacle substantially surrounds said internal structure and substantially prevents radiation from said internal structure passing therethrough; and lifting said receptacle which stores said internal structure out of said nuclear reactor building through said opening.

2. A method of handling an internal structure of a nuclear reactor according to claim 1, wherein said receptacle has an inlet port at a lower end thereof through which said internal structure is inserted into said receptacle and said inlet port is closeable so that said receptacle substantially surrounds said internal structure.

3. A method of handling an internal structure of a nuclear reactor according to claim 1, wherein said receptacle is one of a container and a cask.

4. A method of handling an internal structure of a nuclear reactor according to claim 3, wherein said receptacle is a cask.

5. A method of handling an internal structure of a nuclear reactor, comprising the steps of:

lifting and inserting a cask in a nuclear reactor building containing the nuclear reactor from outside of said nuclear reactor building through an opening which is opened at an upper portion of said nuclear reactor building;

maintaining said cask under a lifted condition in which said cask is positioned above an upper portion of said internal structure of a nuclear reactor pressure vessel of the nuclear reactor;

inserting and storing said internal structure in said cask which is maintained under said lifted condition so that said cask substantially surrounds said internal structure and substantially prevents radiation from said internal structure from passing therethrough; and lifting said cask which stores said internal structure out of said nuclear reactor building through said opening.

6. A method of handling an internal structure of a nuclear reactor according to claim 5, wherein a hoisting device is provided for said cask and is lifted and inserted together with said cask into said nuclear reactor building; and said internal structure is inserted and stored in said cask utilizing said hoisting device.

7. A method of handling an internal structure of a nuclear reactor according to claim 5 or claim 6, wherein:

an inlet port of said cask for enabling inserting and storing of said internal structure is provided at a lower end of said cask;

a cask bottom portion member for closing said inlet port of said cask is mounted to a bougie car which moves freely on an operation floor of said nuclear reactor building; and further comprising the steps of:

positioning said cask bottom portion member below said inlet port of said cask by moving said bougie car; and closing said inlet port of said cask by mounting said cask bottom portion member to said cask.

8. A method of handling an internal structure of a nuclear reactor according to claim 7, wherein:

a crane is utilized for lifting said cask into and out of said nuclear reactor building, said crane being provided outside of said nuclear reactor building; and after said cask in which said internal structure is stored is lifted out of said nuclear reactor building, utilizing said crane to place said cask into a reservoir.

9. A method of handling an internal structure of a nuclear reactor according to claim 8, further comprising the steps of:

adjusting a pressure in said nuclear reactor building provide a negative pressure condition in said nuclear reactor building in comparison with a pressure outside of said nuclear reactor building;

providing an opening and closing means for said opening of said nuclear reactor building; and opening and closing said opening to enable said cask to pass therethrough utilizing said opening and closing means while maintaining the negative pressure in said nuclear reactor building.

10. A method of handling an internal structure of a nuclear reactor according to claim 9, further comprising the steps of:

after said cask is stored in said internal structure and before said cask is lifted from said nuclear reactor building, isolating a first space of said nuclear reactor building including said cask which stores said internal structure and said opening utilizing a sheet from a second space of said nuclear reactor building; and thereafter passing said cask through said opening out of said nuclear reactor building.

11. A method of handling an internal structure of a nuclear reactor according to claim 10, further comprising the steps of:

separating a shroud which is an internal structure of said nuclear reactor pressure vessel from said nuclear reactor pressure vessel; and inserting and storing said separated shroud in said cask.

12. A method for exchanging over an internal structure of a nuclear reactor according to claim 11, further comprising the steps of:

separating a shroud which is said internal structure from said nuclear reactor pressure vessel of the nuclear reactor; and taking the separated shroud out of said nuclear reactor building through said opening which is opened at said upper portion of said nuclear reactor building.

13. A method for exchanging over an internal structure of a nuclear reactor, further comprising the steps of:

taking out said internal structure through said opening which is opened at said upper portion of said nuclear reactor building in accordance with the handling method of said internal structure of the nuclear reactor defined in any one of claims 1, 5 and 6;

lifting and inserting a new internal structure into said nuclear reactor building from the outside of said nuclear reactor building through said opening which is opened at said upper portion of said nuclear reactor building;

installing said new internal structure in said nuclear reactor pressure vessel of the nuclear reactor; and closing said opening which is opened at said upper portion of said nuclear reactor building.

* * * * *